(No Model.) 2 Sheets—Sheet 1.

G. D. HAWORTH.
CORN PLANTER.

No. 351,177. Patented Oct. 19, 1886.

ATTEST
W. L. Jones
C. C. Clark

INVENTOR
G. D. Haworth
By L. P. Graham
atty.

(No Model.) 2 Sheets—Sheet 2.

G. D. HAWORTH.
CORN PLANTER.

No. 351,177. Patented Oct. 19, 1886.

ATTEST
W. L. Jones
C. C. Clark

INVENTOR
G. D. HAWORTH
By L. P. Graham
atty.

UNITED STATES PATENT OFFICE.

GEORGE D. HAWORTH, OF DECATUR, ILLINOIS.

CORN-PLANTER.

SPECIFICATION forming part of Letters Patent No. 351,177, dated October 19, 1886.

Application filed July 6, 1886. Serial No. 207,183. (No model.)

*To all whom it may concern:*

Be it known that I, GEORGE D. HAWORTH, of the city of Decatur, county of Macon, and State of Illinois, have invented certain new and useful Improvements in Corn-Planters, of which the following is a specification.

My invention relates to corn-covering mechanism, and, while applicable with readily obvious modifications to all classes of corn-planters, is particularly adapted to planters in which the main wheels run alongside the rows of corn at a greater or less distance therefrom, and in which independent covering-wheels are used, my object being to provide means whereby the operation of covering the corn may be varied to conform to the requirements of the many kinds and conditions of soil that are to be met with in different seasons and different portions of the same season throughout the largely-extended area in which corn is cultivated.

Figure 1:
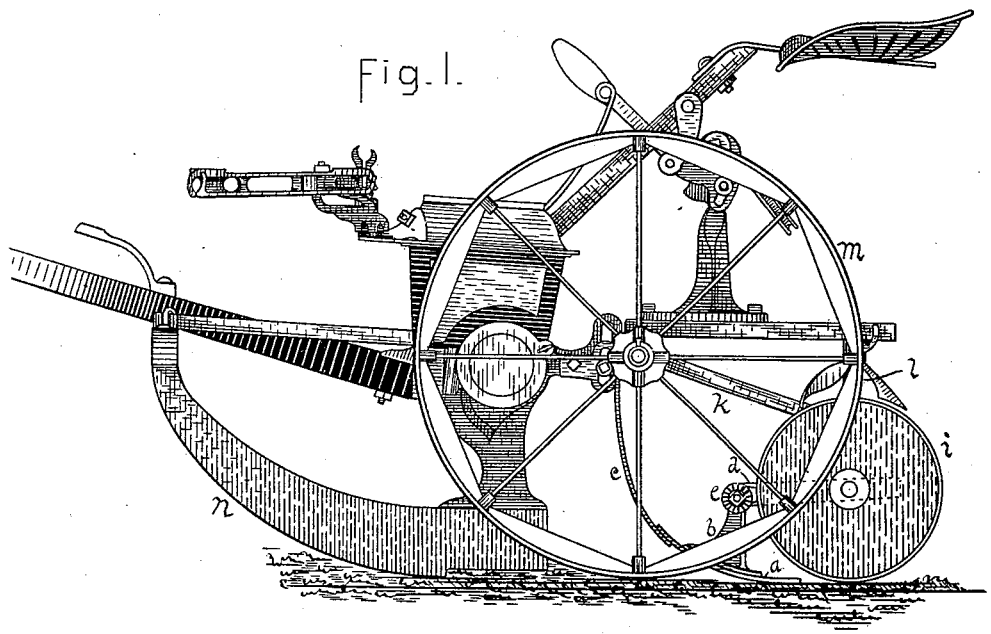
Figure 2:
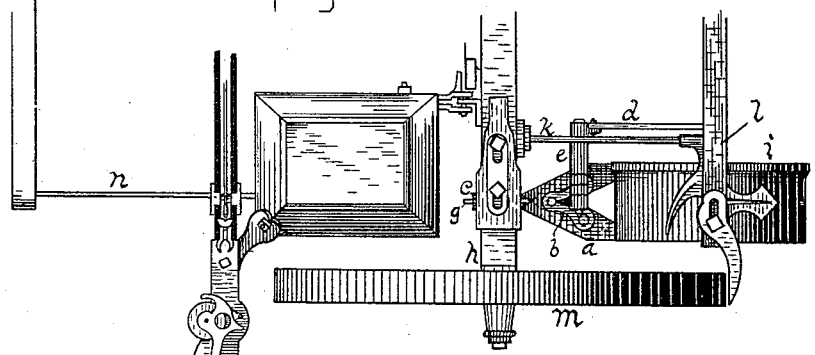
Figure 3:
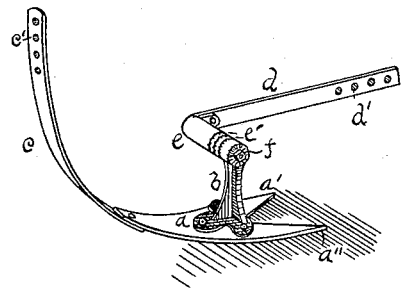
Figure 4:
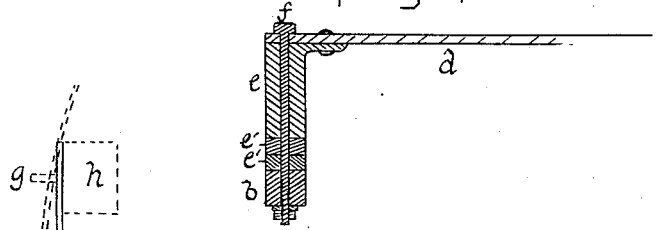
Figure 5:
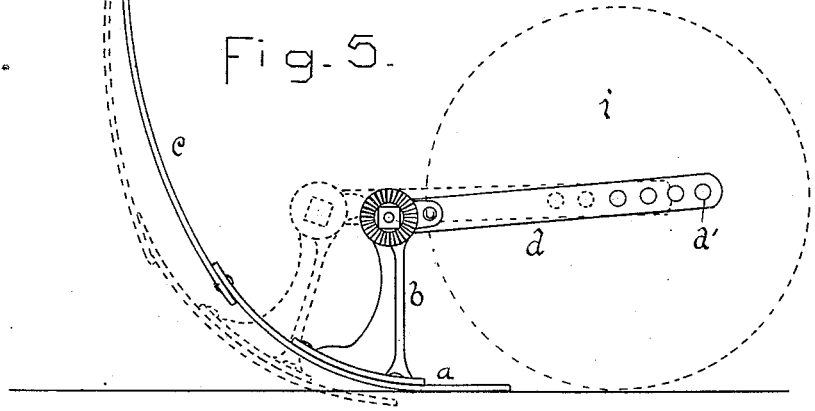

In the drawings accompanying and forming a part of this specification, Figure 1 is a side elevation of a corn-planter embodying my invention. Fig. 2 is a plan of a portion of said planter. Fig. 3 is a perspective view of my improvement separate from the planter. Fig. 4 is a sectional view of certain details to be hereinafter referred to; and Fig. 5 is a side elevation of my device, showing its manner of adjustment with relation to the planter.

$a$ represents a shoe curved upwardly in front and having its rear portion bifurcated.

$a'$ and $a''$ in Fig. 3 represent the forks of the shoe, the inner sides of which diverge in approximate right lines.

$b$ represents a bracket, forming an approximate right angle with shoe $a$.

$c$ is a bar that forms a continuation of the upward curve of the shoe and connects the same with the axle of the main wheels of the planter.

$c'$ represents a series of holes longitudinally arranged in the upper portion of bar $c$, which holes are intended to fit over a pin on the axle and render the vertical position of said bar adjustable.

$d$ is a bar that, when the shoe is in operation, is rigidly attached to the upper end or head of the bracket $b$, and which, extending backwardly and upwardly, connects with a bolt concentric with the adjacent covering-wheel.

$e$ represents a tubular projection rigid with bar $d$, and rotatingly adjustable with relation to the head of bracket $b$.

$e'$ (see Figs. 3 and 4) represents washers interposed between the head of the bracket and tubular projection $e$ in numbers sufficient to produce requisite space between bar $d$ and bracket $b$.

The faces of the head of the bracket, the bracket-opposing surface of projection $e$, and the faces of all interposing washers, are radially and correspondingly corrugated. A bolt, $f$, with a suitable nut, extends through projection $e$, washers $e'$, and the head of the bracket, binding them all rigidly together. A pin, $g$, projects from the front of the axle $h$ of main wheels $m$, and provides a support for the front portion of the shoe. An arm, $k$, is pivotally connected with axle $h$, and, extending backwardly to point $l$, connects with a bracket on which covering-wheel $i$ and bar $d$ have concentric bearings. The shoe is held on a line with runner $n$; but the main wheels and covering-wheels have each a limited amount of lateral adjustment with relation to said runner, the object of such adjustment being to enable the ground to be pressed by said wheels (more or less) directly over the corn. By means of bar $c$, with its holes $c'$ and the pin $g$ on the axle, the front end of the shoe may be raised or lowered. By means of the holes $d'$ in bar $d$ and a bolt concentric with the covering-wheel $i$ the adjustment of the front end of the shoe may be compensated for, and by means of the bolt $f$ and the corrugated faces of the bracket-head, washers, and projection $e$, the angle formed by bar $d$ and bracket $b$ may be varied and the position of the bottom of the shoe be vertically adjusted. As shown in Figs. 1, 2, 3, and in the solid lines of Fig. 5, the shoe is placed with its plane under surface on a level with the lower surface of the wheels, and its bifurcations are consequently inoperative. In the dotted lines of Fig. 5 the plane surface of the shoe is, to a certain extent, opposed to the direction of the motion of the planter, by means hereinbefore set forth, and the bifurcations are in a position to pulverize the soil and slightly elevate the same over the row of corn that is planted by the runner, behind which it moves.

The adjustment suggested in Fig. 5 may be carried to a greater or less extent, according as it is desired to simply press the soil over the corn or to pulverize and elevate it, different soils requiring different methods of treatment, and when it is considered that the wheels with which the shoe is preferably used have a lateral adjustment that enables the arrangement of the soil in the rows to be still further modified, the full utility of the improvement will be manifest.

As citing the two extremes of operation to which my invention is applicable, it may be stated that, under particularly unfavorable circumstances, the bifurcations of the shoe may be made to penetrate the soil to a considerable depth, thoroughly pulverizing the same and arranging it in a diminutive ridge over the row, while at the same time the covering-wheels may be made to run directly over the ridge, and the main wheels be made to run close to the row, thus exhausting the pulverizing powers of the planter. On the contrary, when the soil is in a very favorable condition, the shoe may be made to run flatly, the main wheels be set to run at a considerable distance from the row, and the covering-wheels be dispensed with.

The internal construction of the head of the bracket, the projection on bar $d$, and the interposed washers, are best shown in Fig. 4, and as a matter of convenience it is better to provide the bolt $f$ with a number of washers sufficient to compensate for the various degrees of lateral adjustment in the covering-wheels, and to effect the necessary variations by interposing a greater or less number of the washers between the projection and the bracket, the residue of said washers being placed on the bolt at the outside of the bracket or the outside of the bar, in order that they may always be readily accessible, and in order that the various parts may be rigidly connected without the necessity of undue adjustment of the nut on the bolt.

Throughout the specification the shoe has been spoken of in the singular, but it is obvious without explanation that a shoe should follow each runner of the planter.

I do not claim, broadly, a bifurcate covering-shoe; nor do I claim, broadly, a covering-shoe capable of inclinatory adjustment with relation to the ground; but,

Having thus described my invention, I claim as new and desire to secure by Letters Patent—

1. In corn-planters, a rearwardly-bifurcate covering-shoe having an approximately plane under surface, and means whereby said under surface may be presented and held at a greater or less angle with the surface of the ground.

2. In corn-planters, a rearwardly-bifurcate covering-shoe having an approximately plane under surface curving upwardly at its forward end, and means whereby the said shoe may be presented and held at a greater or less angle with the ground.

3. In corn-planters, a rearwardly-bifurcate shoe, a continuation of the front end of said shoe upwardly extended and adapted to be connected with the planter-frame in a longitudinally-adjustable manner, and an arm rigidly secured to the shoe and adapted to extend upwardly and backwardly from said shoe and connect with the rearward portion of the planter-frame, all in combination as and for the purpose set forth.

4. In corn-planters, in combination, a covering-shoe, a continuation of the front of said shoe extending upwardly and connecting with the planter-frame in a longitudinally-adjustable manner, a bracket on the shoe, and a bar having radial adjustment on the bracket and extending rearwardly to the planter-frame, with which it connects.

5. In corn-planters, in combination, a covering-shoe, a continuation of the front of said shoe extending upwardly to and connecting with the planter-frame in a longitudinally-adjustable manner, a bracket on the shoe having a head with a radially-corrugated face, a bar having a radially-corrugated face opposed to the face of the bracket, the said bar extending to the rear portion of the planter-frame, with which it is connected in a longitudinally-adjustable manner, and a bolt extending through the bracket-head and the opposing surface of the bar.

6. In corn-planters, in combination, a covering-shoe, a continuation of the front portion of the shoe extending upwardly and provided with a series of holes longitudinally arranged, a bracket on the shoe having a head with a radially-corrugated face, a bar extending rearwardly from the bracket, having a series of holes longitudinally arranged, and also having a radially-corrugated face in opposition to the face of the bracket, and a bolt extending through the bracket-head and the opposing surface of the bar.

7. In corn-planters, in combination, a covering-shoe, a continuation of the shoe extending upwardly and provided with a series of holes longitudinally arranged, a bracket on the shoe having a head provided with a radially-corrugated face, a bar provided with a series of holes longitudinally arranged and having a radially-corrugated face in opposition to the face of the bracket, washers with radially-corrugated faces interposed between the bar and the bracket, and a bolt extending through the bracket-head, bar, and washers.

8. In corn-planters, in combination, axle $h$, having pin $g$, a bolt concentric with wheel $i$, shoe $a$, having continuation $c$, provided with holes $c'$, bracket $b$, having radially-corrugated faces, bar $d$, provided with holes $d'$, projection $e$, rigid with bar $d$, and provided with a radially-corrugated face, washers $e'$, having radially-corrugated faces, and bolt $f$, extending through the bracket-head, washers, and projection, as and for the purpose set forth.

9. In corn-covering mechanism, the combination of a rearwardly-bifurcate covering-shoe adapted to be presented and held at various angles with relation to the surface of the ground and a following-wheel.

10. In corn-covering mechanism, the combination of a rearwardly-bifurcate shoe adapted to be presented and held at various angles with relation to the ground and a laterally-adjustable following-wheel.

In testimony whereof I sign my name in the presence of two subscribing witnesses.

GEO. D. HAWORTH.

Attest:
  THEODORE NELSON,
  GEORGE S. SIMPSON.